United States Patent [19]
Bliss

[11] Patent Number: 5,585,975
[45] Date of Patent: Dec. 17, 1996

[54] EQUALIZATION FOR SAMPLE VALUE ESTIMATION AND SEQUENCE DETECTION IN A SAMPLED AMPLITUDE READ CHANNEL

[75] Inventor: William G. Bliss, Thornton, Colo.

[73] Assignee: Cirrus Logic, Inc., Fremont, Calif.

[21] Appl. No.: 340,993

[22] Filed: Nov. 17, 1994

[51] Int. Cl.$^6$ .............................. G11B 5/09; G11B 5/035
[52] U.S. Cl. ............................... 360/65; 360/51; 375/355
[58] Field of Search .................................. 360/65, 40, 66, 360/67, 22, 24, 51; 341/59; 364/602; 375/290, 340, 345, 376, 355

[56] References Cited

U.S. PATENT DOCUMENTS

| | | | |
|---|---|---|---|
| 4,609,907 | 9/1986 | Adler et al. | 341/59 |
| 4,890,299 | 12/1989 | Dolivo et al. | 375/290 |
| 5,258,933 | 11/1993 | Johnson et al. | 364/602 |
| 5,297,184 | 3/1994 | Behrens et al. | 375/345 |
| 5,329,554 | 7/1994 | Behrens et al. | 375/340 |
| 5,359,631 | 10/1994 | Behrens et al. | 375/376 |
| 5,424,881 | 6/1995 | Behrens et al. | 360/40 |
| 5,453,888 | 9/1995 | Tsunoda et al. | 360/65 X |
| 5,521,767 | 5/1996 | Weng et al. . | |

OTHER PUBLICATIONS

Cideciyan, Dolivo, Hermann, Hirt, Schott, "A PRML System for Digital Magnetic Recording", IEEE Journal on Selected Areas in Communication vol. 10, No. 1, pp. 38–56, Jan. 1992.

Hong, Wood, Chan, "An Experimental 180 Mb/sec PRML Channel for Magnetic Recording", IBM Storage System Products Division, vol. 27 No. 6, Nov. 1991.

*Primary Examiner*—Aristotelis Psitos
*Assistant Examiner*—Patrick Wamsley
*Attorney, Agent, or Firm*—Howard S. Sheerin

[57] ABSTRACT

In a sampled amplitude magnetic read channel, pulses in an analog signal corresponding to flux transitions on a magnetic medium are sampled and equalized into a first equalization for estimating sample values and into a second equalization for sequence detection of digital data. A gain and phase error detector generate respective error signals corresponding to the difference between estimated and actual sample values. Gain control and timing recovery use the error signals to adjust the amplitude and sampling frequency/phase of the analog read signal. A pair of programmable discrete time filters equalize the signal samples into the desired equalization. In a first embodiment, the signal samples are equalized to PR4 for estimating sample values and to EPR4 for sequence detection. A slicer processes the PR4 equalized sample values to generate the estimated sample values. The gain and phase error detectors generate the corresponding error signals according to a minimum mean squared error stochastic gradient algorithm. In a second embodiment, the signal samples are equalized to EPR4 for estimating sample values and to EEPR4 for sequence detection. A pulse detector processes the EPR4 equalized sample values in order to detect pulses in the analog signal and generate a corresponding pulse detect signal. The gain and phase error detectors generate the corresponding error signals in response to the pulse detect signal. To minimize circuitry and associated cost, the discrete time equalizing filters are implemented in series. For d=1 recording, the second equalizing filter is a (1+D) notch filter that attenuates the noise caused by clocking the discrete time circuitry at half the sampling rate, thereby increasing the accuracy of the sequence detector.

29 Claims, 10 Drawing Sheets

EQUALIZATION FOR SAMPLE VALUE ESTIMATION AND SEQUENCE DETECTION IN A SAMPLED AMPLITUDE READ CHANNEL

FIELD OF INVENTION

The present invention relates to the control of magnetic storage systems for digital computers, and particularly, to a sampled amplitude read channel that employs a first equalizing filter for estimating sample values, and a second equalizing filter for detecting user data.

CROSS REFERENCE TO RELATED APPLICATIONS AND PATENTS

This application is related to other co-pending U.S. patent applications, namely application Ser. Nos. 08/341,251 entitled "Sampled Amplitude Read Channel Comprising Sample Estimation Equalization, Defect Scanning, Channel Quality, Digital Servo Demodulation, PIP Filter for Timing Recovery, and DC Offset Control," 08/012,266, now U.S. Pat. No. 5,424,881, entitled "Synchronous Read Channel," 08/236,719, now abandoned, entitled "Method and Apparatus for Calibrating a PRML Read Channel Integrated Circuit," and 08/313,491, now abandoned, entitled "Improved Timing Recovery For Synchronous Partial Response Recording." This application is also related to several U.S. patents, namely U.S. Pat. No. 5,359,631 entitled "Timing Recovery Circuit for Synchronous Waveform Sampling," 5,291,499 entitled "Method and Apparatus for Reduced-Complexity Viterbi-Type Sequence Detectors," 5,297,184 entitled "Gain Control Circuit for Synchronous Waveform Sampling," and 5,329,554 entitled "Digital Pulse Detector." All of the above-named patent applications and patents are assigned to the same entity, and all are incorporated herein by reference.

BACKGROUND OF THE INVENTION

In magnetic storage systems for computers, digital data serves to modulate the current in a read/write head coil so that a sequence of corresponding magnetic flux transitions are written onto a magnetic medium in concentric tracks. To read this recorded data, the read/write head passes over the magnetic medium and transduces the magnetic transitions into pulses in an analog signal that alternate in polarity. These pulses are then decoded by read channel circuitry to reproduce the digital data.

Decoding the pulses into a digital sequence can be performed by a simple peak detector in a conventional analog read channel or, as in more recent designs, by using a discrete time sequence detector in a sampled amplitude read channel. Discrete time sequence detectors are preferred over simple analog pulse detectors because they compensate for intersymbol interference (ISI) and, therefore, are less susceptible to noise. As a result, discrete time sequence detectors increase the capacity and reliability of the storage system. There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In conventional peak detection schemes, threshold crossing or derivative information, implemented in analog circuitry, is normally used to detect peaks in the continuous time analog signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

Detection errors are also caused by intersymbol interference (ISI). Storage density is directly related to the number of pulses stored on the storage medium, and as the pulses are packed closer together in the effort to increase data density, they eventually interfere with each other resulting in intersymbol interference. This interference can cause a peak to shift out of its bit cell, or its magnitude to decrease, and result in a detection error. The ISI effect is reduced by decreasing the data density or by employing an encoding scheme to ensure that a minimum number of "0" bits occur between "1" bits. For example, a (d,k) run length limited (RLL) code constrains to d the minimum number of "0" bits between "1" bits, and to k the maximum number of consecutive "0" bits. A typical RLL code is a (1,7) ⅔ rate code which encodes 8 bit data words into 12 bit codewords to satisfy the (1,7) constraint.

Sampled amplitude detection, such as partial response (PR) with Viterbi detection, allows for increased data density by compensating for intersymbol interference. Unlike conventional peak detection systems, sampled amplitude recording detects digital data by interpreting, at discrete time instances, the actual value of the pulse data. The analog pulses are sampled at the baud rate and the digital data is detected from these discrete time sample values. A discrete time sequence detector, such as a Viterbi detector, interprets the discrete time sample values in context to determine a most likely sequence for the data. In this manner, the effect of ISI can be taken into account during the detection process thereby decreasing the probability of a detection error. After processing a consecutive sequence of sample values, the sequence detector compensates for ISI by selecting the most likely digital sequence associated with the sample values. This increases the signal to noise ratio and, for a given (d,k) constraint, allows for significantly higher data density as compared to conventional analog peak detection read channels.

The application of sampled amplitude techniques to digital communication channels is well documented. See Y. Kabal and So Pasupathy, "Partial Response Signaling", *IEEE Trans. Commun. Tech.*, Vol. COM-23, pp.921–934, September 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp.38–56; and Wood et al, "Viterbi Detection of Class IV Partial Response on a Magnetic Recording Channel", *IEEE Trans. Commun.*, Vol. Com-34, No. 5, pp. 454–461, May 1986; and Coker Et al, "Implementation of PRML in a Rigid Disk Drive", *IEEE Trans. on Magnetics*, Vol. 27, No. 6, November 1991; and Carley et al, "Adaptive Continous-Time Equalization Followed By FDTS/DF Sequence-Detection", Digest of The Magnetic Recording Conference, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, September 1994; and Abbott et al, "Timing Recovery For Adaptive Decision Feedback Equalization of The Magnetic Storage Channel", *Globecom'90 IEEE Global Telecommunications Conference* 1990, San Diego, Calif., November 1990, pp.1794–1799; and Abbott et al, "Performance of Digital Magnetic Recording with Equalization and Offtrack Interference", *IEEE Transactions on Magnetics*, Vol. 27, No. 1, January 1991; and Cioffi et al, "Adaptive Equalization in Magnetic-Disk Storage Channels", *IEEE Communication Magazine*, February 1990; and Roger Wood, "Enhanced Decision Feedback Equalization", *Intermag'90*.

Timing Recovery

Similar to conventional peak detection systems, sampled amplitude detection requires timing recovery in order to correctly extract the digital sequence. Rather than process the continuous signal to align peaks to the center of bit cell periods, as in peak detection systems, sampled amplitude systems synchronize the sampling of the pulses. That is, timing recovery adjusts the sampling clock in order to minimize the error between the signal sample values and estimated sample values. A pulse detector or slicer determines the estimated sample values from the read signal samples. Even in the presence of ISI the sample values can be estimated and, together with the signal sample values, used to synchronize the sampling of the analog pulses in a decision-directed feedback system.

Normally, a phase-locked-loop (PLL) circuit controls the timing recovery in sampled amplitude detection. A phase detector generates a phase error based on the difference between the estimated samples and the read signal samples. A loop filter filters the phase error, and the filtered phase error operates to adjust the sampling clock which is typically the output of a variable frequency oscillator (VFO) with the filtered phase error as the control input. The output of the VFO controls the sampling clock of a sampling device such as an analog-to-digital (A/D) converter.

It is helpful to first lock the PLL to a reference or nominal sampling frequency so that the desired sampling frequency, with respect to the analog pulses representing the digital data, can be acquired and tracked more efficiently. The nominal sampling frequency is the baud rate, the rate that data were written onto the medium. Therefore, one method to lock-to-reference is to generate a sinusoidal signal relative to the write clock and inject this signal into the PLL. Once locked to the reference frequency, the PLL input switches from the write clock to the signal from the read head in order to synchronize the sampling of the waveform in response to a sinusoidal acquisition preamble recorded on the medium.

The acquisition and tracking modes for timing recovery are related to the data format of the magnetic disk. FIG. 2A shows a magnetic disk comprising a plurality of concentric data tracks 13 wherein each data track 13 is comprised of a plurality of sectors 15. Servo fields 17 are embedded into the sectors 15, and used to control and verify the track and sector position of the read/write head. FIG. 2B shows the format of a sector 15 comprising an acquisition preamble, a sync mark, and user data. The acquisition preamble is a predetermined sequence that allows timing recovery to acquire the desired sampling phase and frequency before reading the user data. After acquisition, the PLL switches to a tracking mode in order to track the desired sampling phase and frequency with respect to the analog pulses representing the user data. The sync mark signals the beginning of the user data. As illustrated in FIG. 2B, a short acquisition preamble is desirable so that there is more storage area for user data.

Prior techniques are known for acquiring and tracking the sampling frequency/phase based on the phase error (herein also referred to as timing gradient or stochastic gradient) computed from the actual signal samples and estimated signal samples obtained from symbol-by-symbol decisions. See "Timing Recovery in Digital Synchronous Receivers"by K. H. Mueller and M. Muller, *IEEE Transactions on Communications*, Vol. Com-24 (1976), pp. 516–531. Co-pending U.S. patent application Ser. No. 08/313,491 entitled "Improved Timing Recovery for Synchronous Partial Response Recording" discloses an improvement to the Mueller and Mueller stochastic gradient method. In this method of timing recovery a slicer, commonly employed in a d=0 PR4 partial response recording channel, estimates the sample values by comparing the signal sample values to predetermined thresholds. A stochastic gradient circuit, which minimizes the mean squared error between the signal sample values and the estimated sample values, generates the phase error to control the sampling clock.

U.S. Pat. No. 5,359,631 entitled "Timing Recovery Circuit for Synchronous Waveform Sampling" discloses yet another method for timing recovery in a sampled amplitude read channel. In this method a pulse detector, commonly employed in a d=1 EPR4 or EEPR4 partial response recording channel, operates to determine the estimated sample values. Again, a stochastic gradient circuit uses the estimated sample values, together with the signal sample values, to generate the phase error for adjusting the sampling clock in the decision-directed feedback system.

Gain Control

Sampled amplitude read channels employ a decision-directed feedback system for controlling the gain of the analog read signal. Rather than adjusting the gain of the read signal so that peaks are accurately detected, as in analog peak detection channels, sampled amplitude channels synchronize the sampling of the pulses. That is, gain control adjusts the gain of the read signal in order to minimize the error between the signal sample values and estimated sample values. A pulse detector or slicer determines the estimated sample values from the read signal samples. Even in the presence of ISI the sample values can be estimated and, together with the signal sample values, used to adjust the gain of the read signal in order to synchronize the sampling of the analog pulses in a decision-directed feedback system.

Normally, a variable gain amplifier adjusts the gain of the read signal in sampled amplitude recording. A stochastic gradient circuit processes the estimated samples and the read signal samples to generate a gain error between the actual and estimated sample values. A loop filter filters the gain error, and the filtered gain error operates to adjust the output of the variable gain amplifier.

Techniques similar to those used for timing recovery are known to be useful in automatic control of signal gain in the sampling of a signal waveform. See Roy D. Cideciyan, Francois Dolivo, Walter Hirt, and Wolfgang Schott, "A PRML System for Digital Magnetic Recording", IEEE Journal on Selected Areas in Communications, Vol. 10 No. 1, January 1992, pp.38–56, which discloses the Mueller and Muller stochastic gradient method for gain control. In this method a slicer, commonly employed in a d=1 PR4 partial response recording channel, estimates the sample values by comparing the signal sample values to predetermined thresholds. A stochastic gradient circuit, which minimizes the mean squared error between the signal sample values and the estimated sample values, generates the gain error to control the output of the variable gain amplifier.

U.S. Pat. No. 5,297,184, entitled "Gain Control Circuit for Synchronous Waveform Sampling", discusses another method for gain control in a sampled amplitude read channel. This method uses a pulse detector, commonly employed in a d=1 EPR4 or EEPR4 partial response recording channel, to determine the estimated sample values. Again, a stochastic gradient circuit uses the estimated sample values, together with the signal sample values, to generate the gain error for adjusting the gain of the read signal in the decision-directed feedback system.

Estimating Sample Values

An inherent problem with using a slicer or pulse detector to determine the estimated sample values is that the accuracy of either is dependent on the equalization employed. For instance, in d=0 partial response recording, equalizing the sample values into a PR4 response maximizes the accuracy of the slicer. Similarly, in d=1 partial response recording, equalizing the sample values into an EPR4 response maximizes the accuracy of the pulse detector. However, the equalization used to optimize the accuracy of the slicer or pulse detector is not normally the optimum equalization for the discrete time sequence detector. In other words, in d=0 partial response recording employing a slicer, a discrete time sequence detector, such as a maximum likelihood Viterbi sequence detector, may work best with samples equalized to an EPR4 response. Similarly, in d=1 partial response recording employing a pulse detector, the sequence detector may work best with samples equalized to an EEPR4 response.

Another drawback overcome by the present invention is a problem associated with sampled amplitude read channels that process two samples at a time. For example, U.S. Pat. No. 5,291,499 entitled "Method and Apparatus for Reduced-Complexity Viterbi-Type Sequence Detectors," discloses a discrete time sequence detector that process two sample values in parallel. In this manner, the discrete time circuitry can operate at half the sampling frequency thereby increasing the overall throughput. However, the discrete time circuitry also produces a significant amount of energy when clocked and, consequently, injects noise into every other sample. This noise coupled into every other sample can decrease the accuracy of the sequence detector.

It is a general object of the present invention to provide a sampled amplitude read channel with a first equalization optimum for estimating sample values and a second equalization optimum for detecting digital data using a discrete time sequence detector. Another object of the second equalization is to filter out noise associated with clocking the discrete time circuitry at half the sample frequency in order to increase the accuracy of the sequence detector. A more specific object is to provide a d=0 sampled amplitude read channel with a first equalization optimum for estimating sample values using a slicer. Another object is to provide a d=1 sampled amplitude read channel with a first equalization optimum for estimating sample values using a pulse detector. Still another object of the invention is to provide programmable control over the equalization. A further object is to minimize the circuitry and associated cost in implementing the equalization.

SUMMARY OF THE INVENTION

The objects of the present invention are achieved by incorporating into a sampled amplitude read channel a first programmable discrete time equalizing filter for generating a first equalization optimum for estimating sample values using a slicer or pulse detector, and a second programmable discrete time equalizing filter for generating a second equalization optimum for detecting digital data with a discrete time sequence detector. Phase and gain error detectors, responsive to the estimated sample values and read signal sample values, generate phase and gain error signals for controlling timing recovery and gain control in a decision-directed feedback system.

In a first exemplary embodiment of a d=0 sampled amplitude read channel, the first equalizing filter is programmed to output signal samples equalized into a PR4 response $(1-D^2)$, and the second equalized filter is programmed to output an EPR4 response $(1-D)(1+D)^2$. A slicer, responsive to the first discrete time equalizing filter, generates estimated sample values. An error detector, which minimizes the mean squared error between the signal sample values and the estimated sample values, generates a phase error to control the sampling frequency/phase and a gain error to control the gain of the analog read signal. A discrete time sequence detector detects digital data from the equalized signal sample values from the second discrete time equalizing filter.

In a second exemplary embodiment of a d=1 sampled amplitude read channel, the first equalizing filter is programmed to output signal samples equalized into an EPR4 response $(1-D)(1+D)^2$, and the second equalized filter is programmed to output an EEPR4 response $(1-D)(1+D)^3$. A pulse detector, responsive to the first discrete time equalizing filter, is used to determine estimated sample values. Respective error detectors operate according to a stochastic gradient algorithm to generate a phase error to control the sampling clock and a gain error to control the gain of the analog read signal. A discrete time sequence detector, responsive to the second equalizing filter, detects digital data from the equalized signal sample values.

Both discrete time equalizing filters are programmable in order to achieve the desired equalization. Further, the filters are programmable in order to switch between desired equalization targets. In the preferred embodiment, for example, the first equalizing filter can be programmed for PR4 or EPR4 equalization. In this manner, a slicer and a pulse detector can be incorporated into a signal integrated read channel IC. This provides the most flexibility in programming the read channel to operate in a particular environment.

In order to minimize the circuitry and associated cost, the discrete time equalizing filters are implemented in serial. That is, the output of the first equalizing filter is connected to the input of the second equalizing filter. This simplifies the second equalizing filter to a $(1+D)$ filter. Further, a $1+D$ filter is a notch filter that attenuates noise associated by clocking the discrete time circuitry at half the sampling rate, thereby increasing the accuracy of the sequence detector.

BRIEF DESCRIPTION OF THE DRAWINGS

The above and other aspects and advantages of the present invention will be better understood by reading the following detailed description of the invention in conjunction with the drawings wherein.

DETAILED DESCRIPTION OF THE PREFERRED EMBODIMENT

Sampled Amplitude Recording Channel

Figure 1:
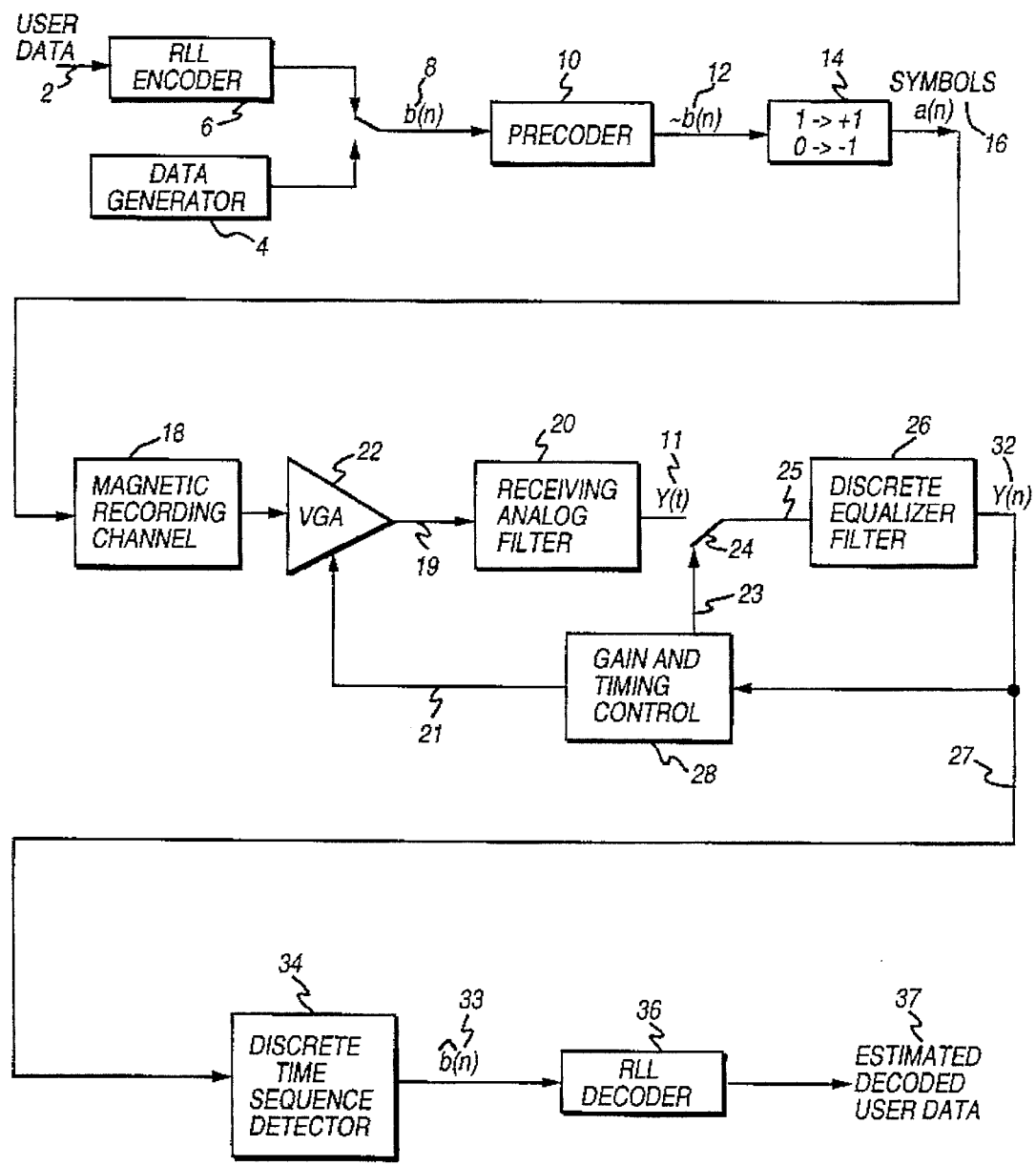
FIG. 1 is a block diagram of a conventional sampled amplitude recording channel.

FIG. 1 is a detailed block diagram of a conventional sampled amplitude read/write recording channel. During a write operation, either user data 2 or preamble data from a data generator 4 (for example 2T preamble data) is written onto the medium. A RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizing filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. The symbols a(n) 16 modulate the current in the recording head coil at the baud rate 1/T to record the binary sequence onto the magnetic medium.

When reading the binary sequence back, a variable gain amplifier 22 adjusts the amplitude of the analog read signal 19, and an analog filter 20 provides initial equalization toward the desired response. A sampling device 24 samples the analog read signal Y(t) 11 from the analog filter 20, and a discrete time filter 26 provides further equalization toward the desired response. In partial response recording, for example, the desired response is often selected from Table 1.

The equalized sample values 32 are applied over line 27 to decision directed gain and timing control 28 for adjusting the amplitude of the read signal and the frequency and phase of the sampling device 24, respectively. Timing recovery adjusts the frequency of sampling device 24 over line 23 in order to synchronize the equalized samples 32 to the waveform (see U.S. patent application Ser. No. 08/313,491, now abandoned, entitled "Improved Timing Recovery For Synchronous Partial Response Recording"). Gain control adjusts the gain of variable gain amplifier 22 over line 21. The equalized samples Y(n) 32 are sent to a discrete time sequence detector 34, such as a maximum likelihood (ML) Viterbi sequence detector, to detect an estimated binary sequence ^b(n) 33. An RLL decoder 36 decodes the estimated binary sequence ^b(n) 33 into estimated user data 37. In the absence of errors, the estimated binary sequence ^b(n) 33 is equal to the recorded binary sequence b(n) 8, and the decoded user data 37 are equal to the recorded user data 2.

Data Format

Figure 2A:
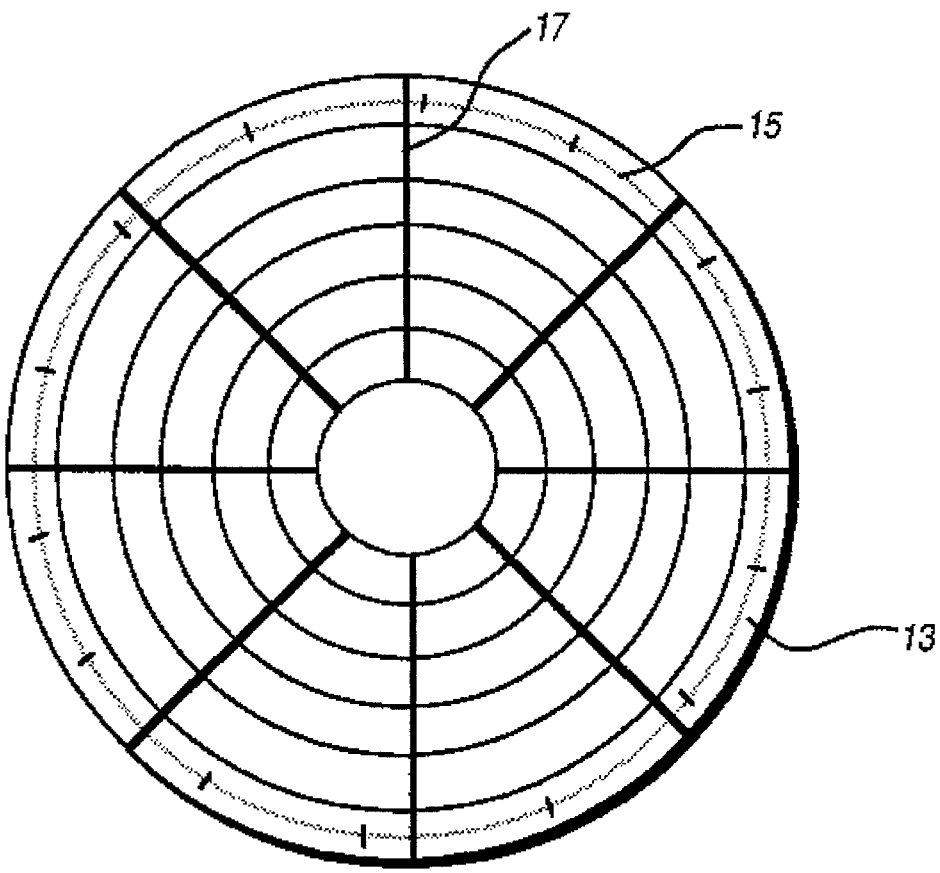
FIG. 2A shows an exemplary data format of a magnetic disk having a plurality of concentric tracks where each track contains a plurality of sectors.
Figure 2B:
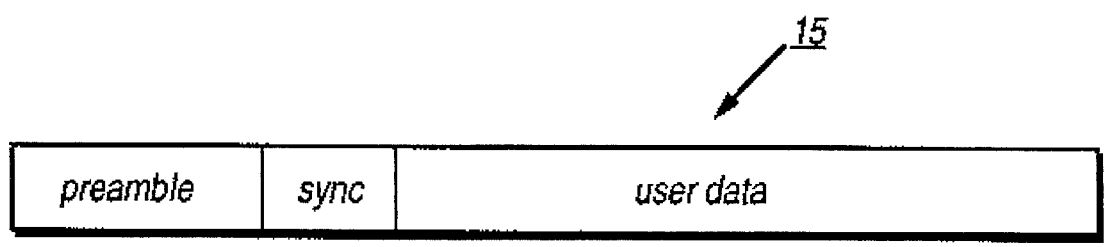
FIG. 2B shows an exemplary format of a sector.

FIG. 2A shows an exemplary data format of a magnetic media comprising a plurality,of concentric data tracks 13 wherein each data track 13 is comprised of a plurality of sectors 15, and wherein a plurality of servo fields 17 are embedded in the sectors. The servo fields 17 are processed to verify the track and sector position of the read/write head. Additionally, servo bursts within the servo field 17 are processed to keep the head aligned over the desired track 13 while writing and reading data. FIG. 2B shows the format of a sector 15 comprising a acquisition preamble, a sync mark, and user data. Timing recovery uses the acquisition preamble to acquire the correct sampling frequency and phase, and the sync mark signals the beginning of user data. See U.S. patent application Ser. No. 08/313,491, now abandoned, entitled "Improved Timing Recovery For Synchronous Partial Response Recording".

Sample Value Estimation

Figure 3:
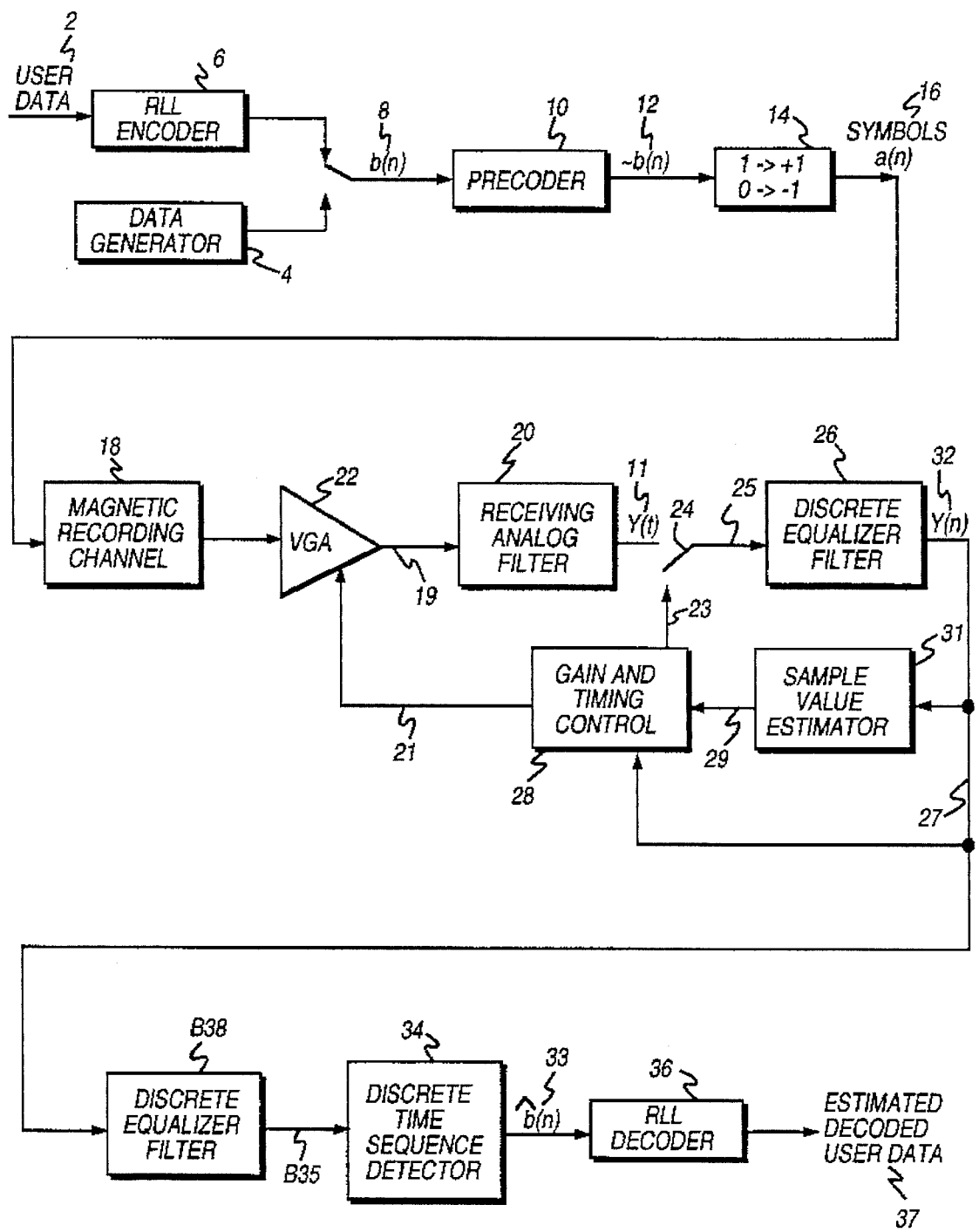
FIG. 3 shows a sampled amplitude recording channel of the present invention comprising a sample value estimator responsive to a first equalizing filter, and a discrete time sequence detector responsive to a second equalizing filter.

FIG. 3 shows a sampled amplitude read channel of the present invention further including a sample value estimator 31 responsive to the first discrete time equalizing filter 26 and a second discrete time equalizing filter B38 for additional equalization of the sample values Y(n) 32 before the discrete time sequence detector 34 detects the digital data. Discrete time equalizing filter 26 equalizes the sample values into a response best suited for estimating sample values, and discrete time equalizing filter B38 equalizes the sample values into a response best suited for detecting digital data. For example, in d=0 partial response recording, the sample value estimator 31 is a slicer (described in detail bellow) that is most accurate when processing sample values equalized into a PR4 response. In d=1 partial response recording, the sample values are estimated using a pulse detector (described in detail bellow) that is most accurate when processing sample values equalized into an EPR4 response.

In either d=0 or d=1 partial response recording, the discrete time sequence detector 34 may be most accurate when processing sample values equalized into a PR4, EPR4 or EEPR4 response depending on the characteristics of the storage device. In the preferred embodiment for d=0 recording, discrete time equalizing filter 26 equalizes the sample values into a PR4 response, and second equalizing filter B38 equalizes the sample values into an EPR4 response. In the preferred embodiment for d=1 recording, discrete time equalizing filter 26 equalizes the sample values into a EPR4 response, and second equalizing filter B38 equalizes the sample values into an EEPR4 response.

Programmable Discrete Time Equalizing Filters

Figure 4:
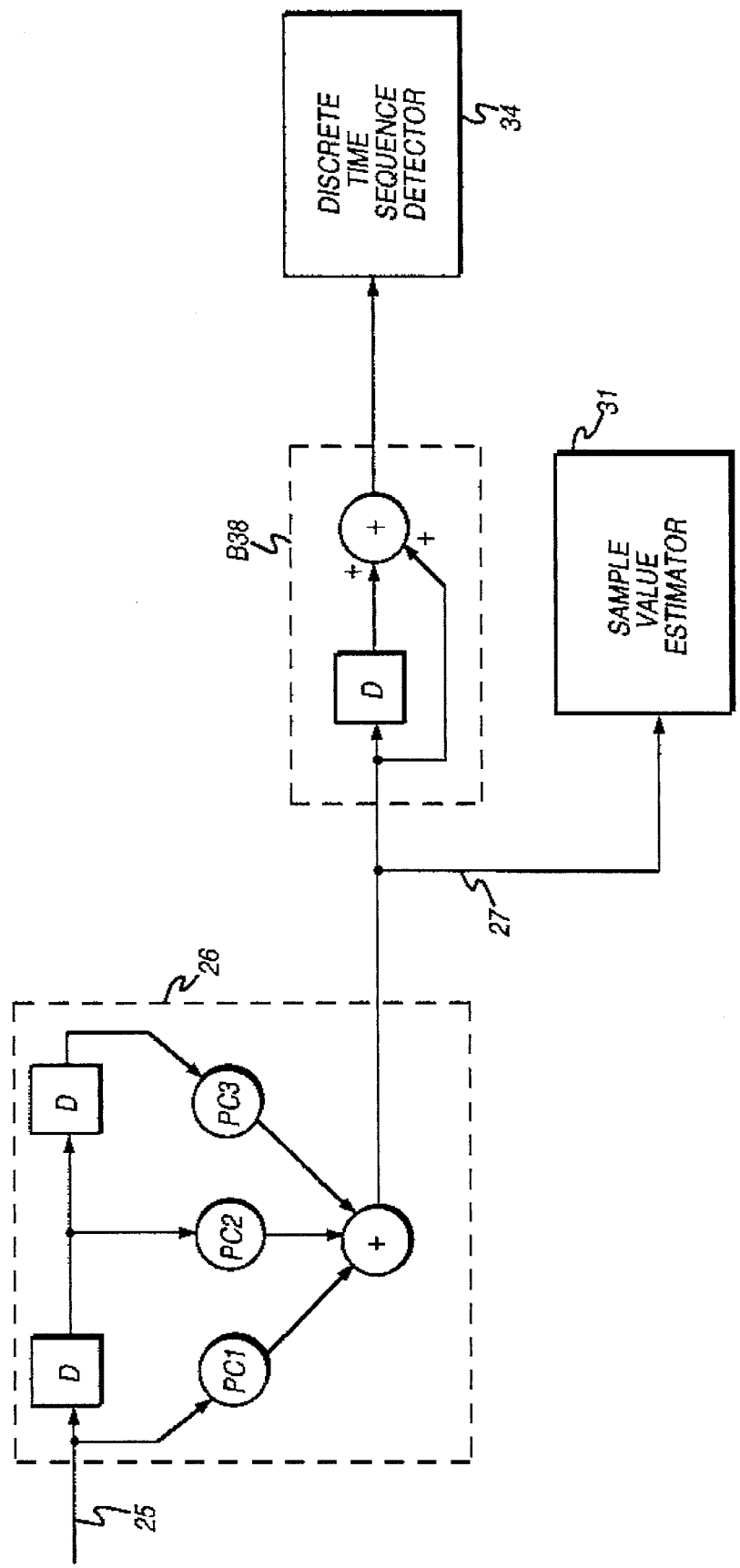
FIG. 4 is a detailed block diagram of the first and second discrete time equalizing filters of the present invention connected in series.

Discrete equalizing filters 26 and B38 of FIG. 4 comprise programmable coefficients that can be adjusted to achieve a desired equalization. For instance, in partial response recording, the analog filter 20 and discrete time filters 26 and B38 are programmed to achieve a partial response selected from Table 1. The coefficients determine the response of a filter to certain pulse shapes. In an idealized recording medium, recorded pulses have a symmetric shape. However, in practice, physical limitations of actual recording media, the transducers used to sense pulses recorded thereon, and the electronic circuits used to process the sensed pulses, all tend to change the pulse shapes into less than ideal symmetric forms. Further, characteristics of the pulse shape change from the inner diameter tracks to the outer diameter tracks on a magnetic disk. Thus, the coefficients of discrete equalizing filters are programmable to permit compensation for the asymmetric pulse shapes typical of magnetic recording technology.

Specifically, first discrete equalizing filter 26 is programmable to permit pulse shaping of the waveforms represented by the sequence of discrete time samples. In addition, the coefficients of discrete equalizing filter 26 of the present invention are programmed to the desired response selected from Table 1. For example, in one embodiment of the present invention, discussed in further detail below, first discrete equalizing filter 26 is programmed to generate a PR4 response while second discrete equalizing filter B38 generates an EPR4 response (when combined serially with the PR4 response from the first filter 26). In an alternative embodiment of the present invention, first discrete equalizing filter 26 is programmed to generate a EPR4 response while second discrete equalizing filter generates an EEPR4 partial response. Each of these embodiments may be implemented, conceptually, by appropriately programming the coefficients of the discrete time equalizing filter 26.

FIG. 4 depicts an exemplary embodiment of first discrete equalizing filter 26, providing programmable coefficients, connected in series with the second discrete time equalizing filter B38. The filters are connected in series which allows the second discrete time filter B38 to be a simple (1+D) filter. This minimizes the circuitry and associated cost. Further, a (1+D) filter is a notch filter that attenuates noise associated by clocking the discrete time circuitry at half the sampling rate, thereby increasing the accuracy of the sequence detector. The coefficients PC1, PC2, and PC3 of discrete time equalizing filter 26 are programmable. Delay circuits D serve to delay their respective inputs by one sample clock period. The output of first equalizing filter 26 is applied to sample value estimator 31, while the output of the second equalizing filter B38 is applied to the discrete time sequence detector 34.

The output of discrete equalizing filter 26 of FIG. 4, applied to timing recovery and gain control 28 over line 27, depends on the input response applied to line 25 and the coefficients PC1, PC2, and PC3. The input response is determined by the magnetic recording channel 18 and the analog filter 20 of FIG. 3. The input response to second discrete equalizing filter B38 is determined by the combined pulse shaping effects of analog filter 20 and first discrete equalizing filter 26. Table B2 shows an example of the coefficients values for PC1, PC2, and PC3 to obtain a desired output partial response. It should be noted that the coefficients listed in Table B2 are intended for an ideal symmetric pulse shape and assumes a particular response from the recording channel 18 and receiving analog filter 20. In practice, the response of the recording channel and analog filter will vary, and the coefficients PC1, PC2, and PC3 are programmed to achieve a particular target pulse shape (i.e., a particular response to a given input pulse). One of ordinary skill in the art will readily recognize that coefficients listed in Table B2 below would be adjusted by appropriate calibration to reshape an asymmetric pulse shape and to compensate for changes in the recording channel.

Equalization For Slicer

Figure 5:
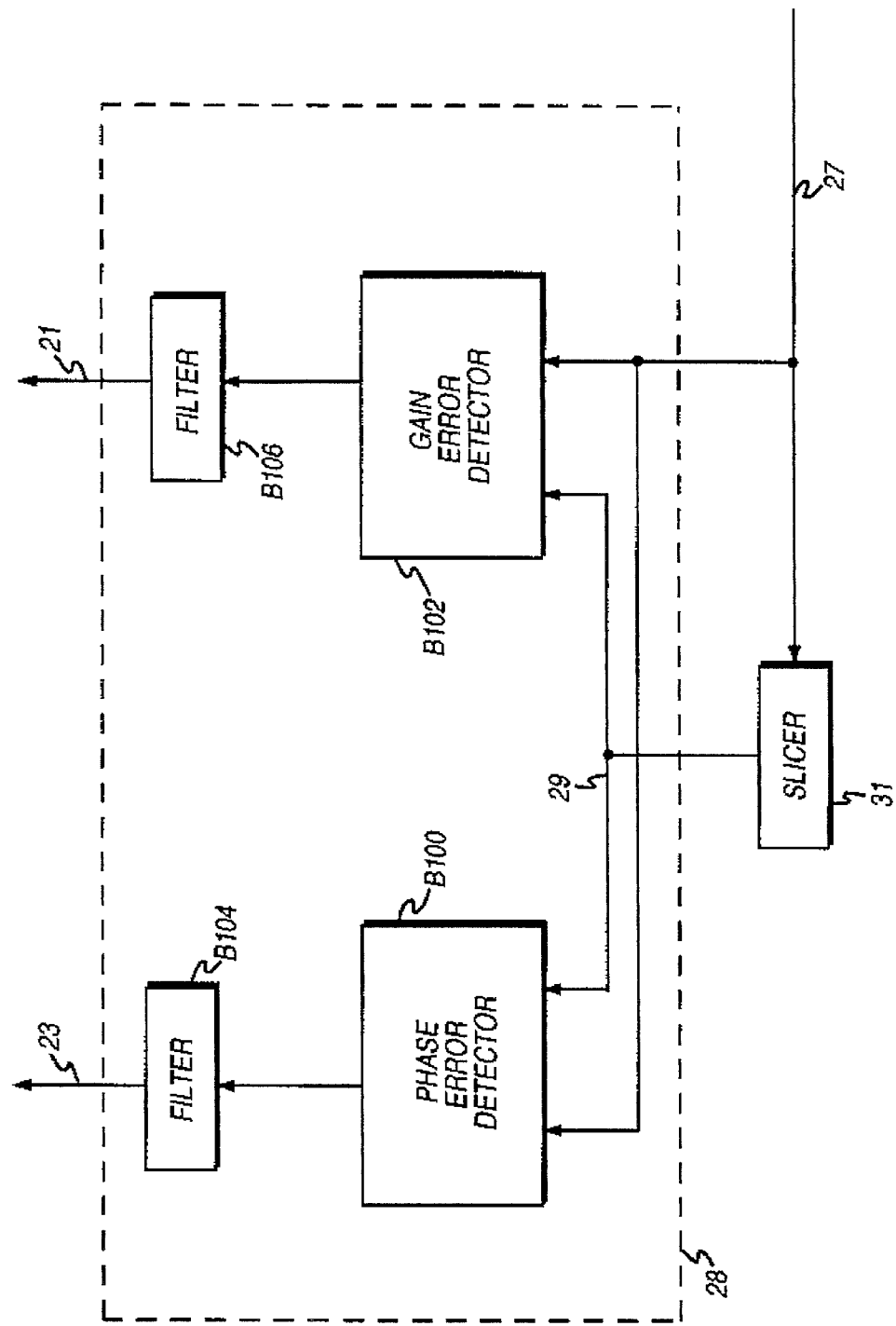
FIG. 5 is a more detailed diagram of the timing and gain control of a d=0 sampled amplitude read channel having a slicer for estimating sample values.

For d=0 sampled amplitude recording, the sample value estimator 31 of FIG. 3 is a slicer 31 as shown in FIG. 5. The slicer 31 generates estimated sample values corresponding to the read signal sample values received over line 27. The estimated sample values are applied over line 29 to gain and timing control 28. Gain and timing control 28 comprises a gain error detector B102 and a phase error detector B100. First discrete equalizing filter 26 of FIG. 3 generates a PR4 response and applies the equalized discrete time samples to the slicer 31 over line 27. Second discrete time equalizing filter B38 generates an EPR4 response and applies the equalized discrete time samples to the discrete time sequence detector 34.

Gain error detector B102 computes a gain error $\Delta g(n)$ for adjusting the amplitude of the analog read signal 19. The gain error detector B102 operates according to a stochastic gradient algorithm for minimizing the mean squared error between the estimated sample values and the read signal sample values. Gain error detector B102 computes $\Delta g(n)$ as:

$$\Delta g(n)=((Y(n)-X(n))*X(n))+((Y(n-1)-X(n-1))*X(n-1)).$$

In the above gain error equation, $Y(n)$ are the discrete time sample values applied to gain error detector B102 over line 27, and $X(n)$ are the estimated sample values from slicer 31 applied over line 29. Only the first term on the right hand side is needed, but adding two consecutive gradients reduces variations in the gain adjustment. The output of gain detector B102 is applied through a filter B106 to the variable gain amplifier (VGA) 22 over line 21.

Phase error detector B100 generates a timing error $\Delta t(n)$ signal to adjust timing of the discrete samples acquired by operation of sampling device 24 of FIG. 3. The phase error detector B100 operates according to a stochastic gradient algorithm for minimizing the mean squared error between the estimated sample values and the read signal sample values. Phase error detector B100 computes the phase error signal $\Delta t(n)$ as:

$$\Delta t(n)=(Y(n-1)*X(n))-(Y(n)*X(n-1)).$$

In the above phase error equation, $Y(n)$ are the read signal sample values applied to the phase error detector B100 over line 27, and $x(n)$ are the estimated sample values generated by the slicer 31 and applied to the phase error detector over line 29. The output of phase error detector B100 is applied through a filter B104 over line 23 to a variable frequency oscillator (VFO) (not shown). The output of the VFO adjusts the frequency of the sampling device 24 such as an A/D converter.

Slicer 31 receives the read signal sample values equalized by discrete time equalizing filter 26 and generates estimated sample values $X(n)$ according to the equations shown in Table B3. In Table B3, y is a discrete time sample value applied to slicer 31 on line 27, T1 is a programmable positive threshold, and −T2 is a programmable negative threshold. The slicer equations of Table B3 are most accurate when the read signal sample values $Y(n)$ 32 are equalized into a PR4 response in d=1 recording. However, the discrete time sequence detector 34 is more accurate if the read signal samples $Y(n)$ 32 are equalized into an EPR4 response.

Therefore, for d=0 recording, the preferred embodiment of the present invention is to program the first discrete time equalizing filter 26 for PR4 equalization and to program the second discrete time equalizing filter B38 for EPR4 equalization.

Equalization For Pulse Detector

Figure 6:
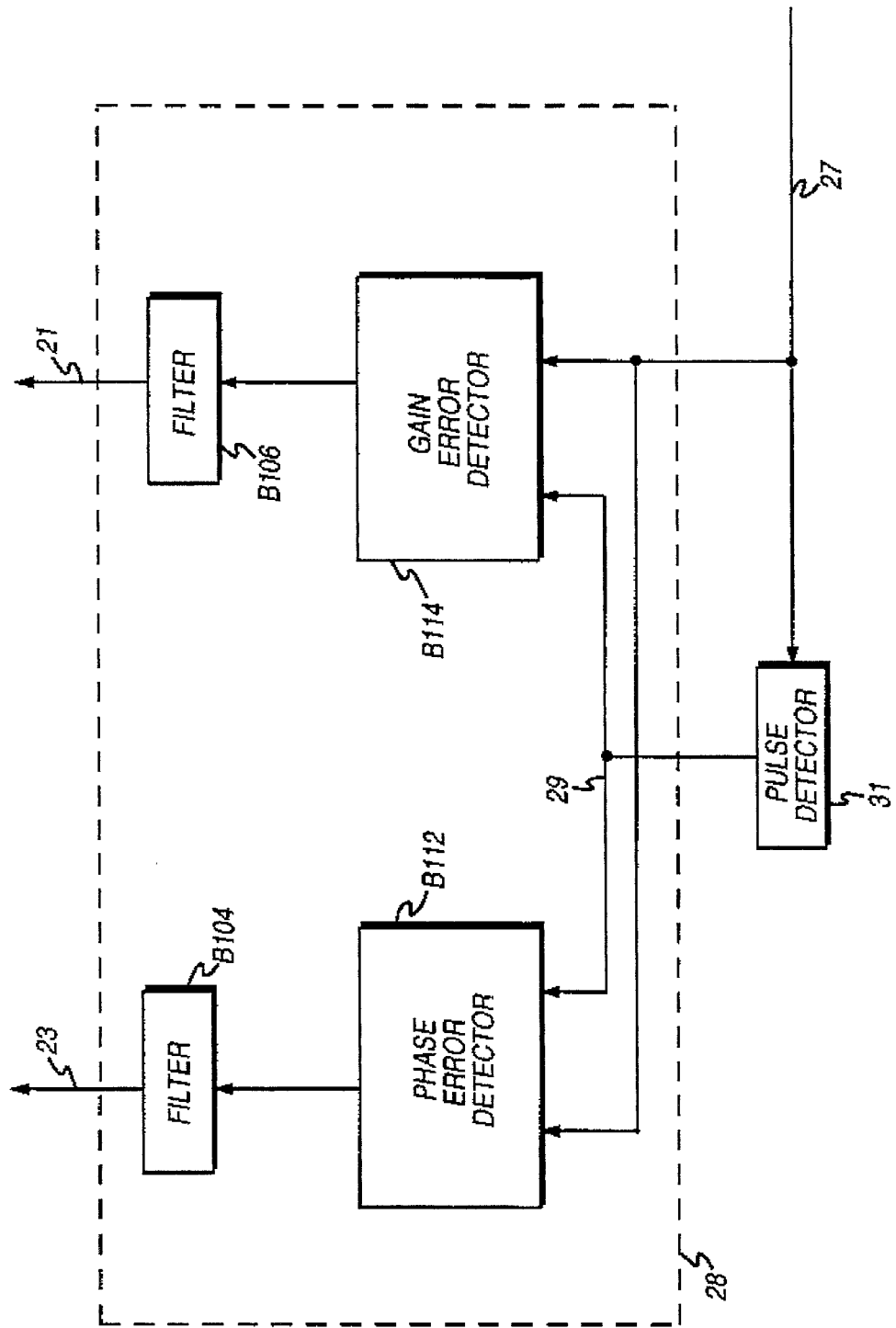
FIG. 6 is a more detailed diagram of the timing and gain control of a d=1 sampled amplitude read channel having a pulse detector for estimating the sample values.

For d=1 sampled amplitude recording, the sample value estimator 31 of FIG. 3 is a pulse detector 31 as shown in FIG. 6. The pulse detector 31 generates a pulse detected signal 29 when a pulse is detected in the read signal sample values received over line 27. The pulse detect signal is applied over line 29 to gain and timing control 28. Gain and timing control 28 comprises a gain error detector B102 and a phase error detector B100. First discrete equalizing filter 26 of FIG. 3 generates an EPR4 response and applies the equalized discrete time samples to the pulse detector 31 over line 27. Second discrete time equalizing filter B38 generates an EEPR4 response and applies the equalized discrete time samples to the discrete time sequence detector 34.

U.S. Pat. No. 5,329,554, issued to Behrens et al., discloses in greater detail a pulse detector capable of detecting a pulse in samples equalized to PR4, EPR4, and EEPR4 for d=1 recording. However, the pulse detector is most accurate when detecting pulses in sample values equalized to EPR4. Therefore, in the preferred embodiment of the present invention for d=1 recording, first discrete equalizing filter 26 of FIG. 3 generates an EPR4 response and applies the equalized discrete time samples to the pulse detector 31 over line 27, and second discrete time equalizing filter B38 generates an EEPR4 response and applies the equalized discrete time samples to the discrete time sequence detector 34 over line B35.

Pulse detector 31 detects the presence of a pulse depending on the equalization (PR4, EPR4, and EEPR4) and the polarity of the pulse (i.e. positive threshold peak amplitude or negative threshold peak amplitude). For EPR4 equalization, pulse detector 31 detects a pulse according to the equations in Table B4, and for PR4 and EEPR4 equalization, pulse detector 31 detects a pulse according to the equations in Table B5. In Table B4 and Table B5, $Y(n)$ are the read signal sample values applied over line 27, $SGN(x)$ is +1 if $x>=0$ and $-1$ if $x<0$, and $(V,-V)$ are programmable positive and negative thresholds. When all comparisons listed in Table B4 or Table B5 are true, pulse detector 31 applies a pulse detected signal to line 29 to indicate a pulse has been detected at time n.

In the Behrens '554 patent, a second embodiment of pulse detector 31 is discussed. In this alternative embodiment, a pulse detector shares circuitry between side sampled pulse detection and center sampled pulse detection. In order to process both sampling modes, a "moving average" circuit is embedded in pulse detector 31 to average the value of two adjacent discrete samples to thereby interpolate a value for use in the shared circuitry. In a sequence of discrete time samples $Y(0)$ through $Y(n)$, the moving average is:

$$Z(x)=(Y(x)+Y(x-1))/2.$$

In this implementation, pulse detector 31 detects a pulse according to Table B6 for PR4 and EEPR4 equalization and according to Table B7 for EPR4 equalization.

In response to the discrete time sample values $Y(n)$ 32 applied over line 27 and the pulse detect signal on line 29, gain error detector B114 and phase error detector B112 generate error signals for adjusting the gain and sampling of the read signal 19, respectively. U.S. Pat. No. 5,297,184, issued to Behrens et al., discloses the details of gain error detector B112 in a sampled amplitude read channel. For PR4 and EEPR4 equalization, the gain detector generates a gain error $\Delta g$ according to Table B8, and for EPR4, according to Table B9. In Table B8 and Table B9, $SGN(x)$ is +1 if $x>=0$ and $-1$ if $x<0$, $\{a,c\}$ are the target sample values for an isolated pulse as shown in FIG. 7 and FIG. 8, ga and gt are acquisition and tracking gain set points, and Pn is one if a pulse is detected at time n.

Figure 7:
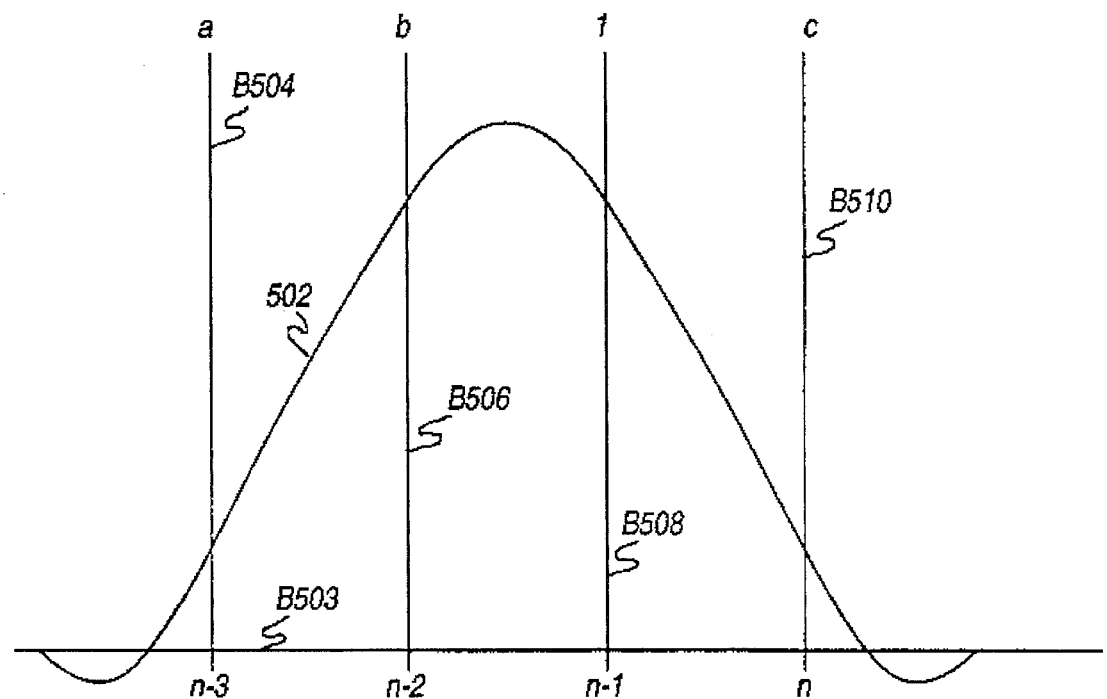
FIG. 7 shows the read signal samples for EEPR4 equalization.

Referring now to FIG. 7 and Table B8, when a pulse is detected at time n for PR4 and EEPR4 equalization, the gain error $\Delta g$ (in both acquisition and tracking) is determined by adding the samples $Y(n-1)$ and $Y(n-2)$, multiplying by $-1$ if the pulse detected at time n is a positive pulse (as indicated by the sign of $Y(n-1)$), and adding the gain set point ga for acquisition mode or gt for tracking mode. Since $Y(n-2)$ is nominally equal to 1, the gain set point ga or gt should nominally be set to (1+b). The term "$-(a+c)Pn-2$" accounts for the ISI effect of adjacent pulses.

Figure 9:
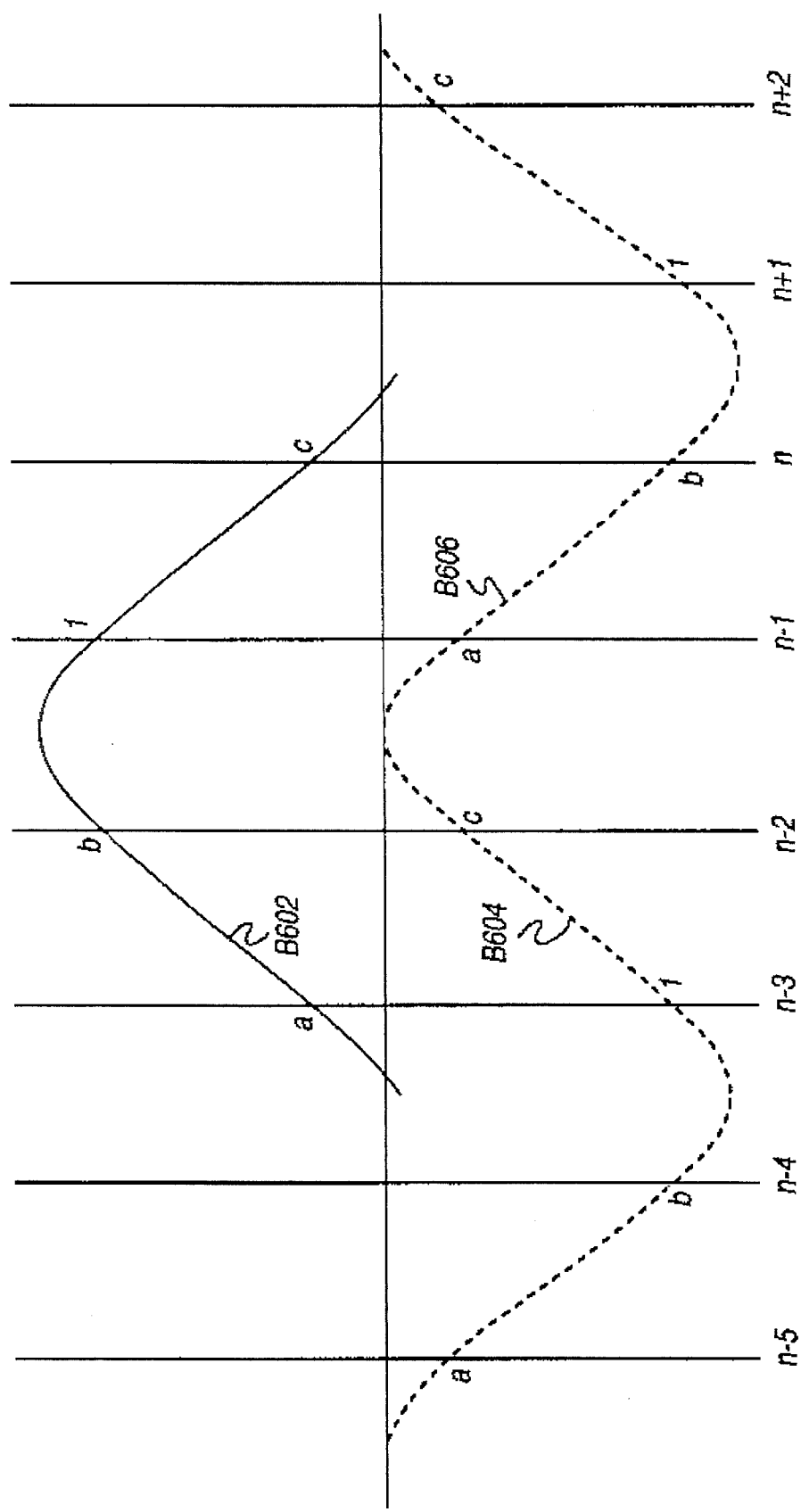
FIG. 9 and 10 show the effect of ISI on the read signal samples in d=1 recording.

The ISI effect of adjacent pulses for PR4 and EEPR4 equalization is illustrated with respect to FIG. 9. Since pulse B604 might have occurred two sample times earlier than pulse B602, and pulse B606 might occur two sample times later, the effects of these pulses must be considered in the equations of Table B8. The term "$-(a+c)Pn-2$" accounts for the ISI effects of pulse B604 and pulse B606. Sample "c" of pulse B604 occurs at the same time as sample "b" of pulse B602. Therefore, if there was a peak detected at time n–2, i.e. Pn–2 is one, the gain is corrected by subtracting a constant value c to offset the "c" sample of pulse B604. Similarly, a pulse could occur two sample times after pulse B602, represented by pulse B606. For this pulse, the "a" sample occurs at the same time as the "1" sample of pulse B602. Therefore, the gain error is corrected by subtracting a constant a if there is a pulse at time n+2, i.e., if Pn+2 is one. Rather than wait two additional sample times to determine whether a pulse occurs at time n+2 before making a gain error measurement, subtraction of the constant a is simply delayed two clock times. This is possible because of the small effect resulting from the pulse B606. The value of constants a and c are determined by calibrating the device.

Figure 8:
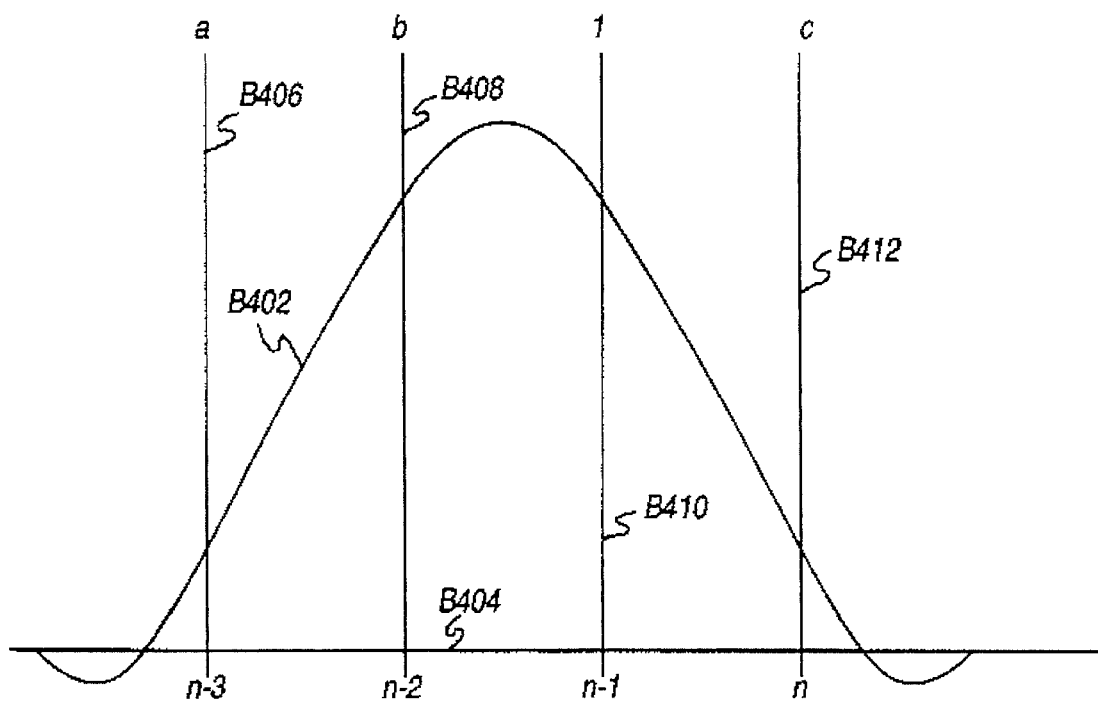
FIG. 8 shows the read signal samples for EPR4 equalization.

Referring now to FIG. 8 and Table B9, when a pulse is detected at time n for EPR4 equalization, the gain error $\Delta g$ (in both acquisition and tracking) is generated similar to PR4 and EEPR4 equalization except that only the "1" sample of each pulse is used to determine the gain error. Therefore, the $Y(n-2)$ term is not used, and the nominal value of the gain set points ga and gt is 1.

Figure 10:
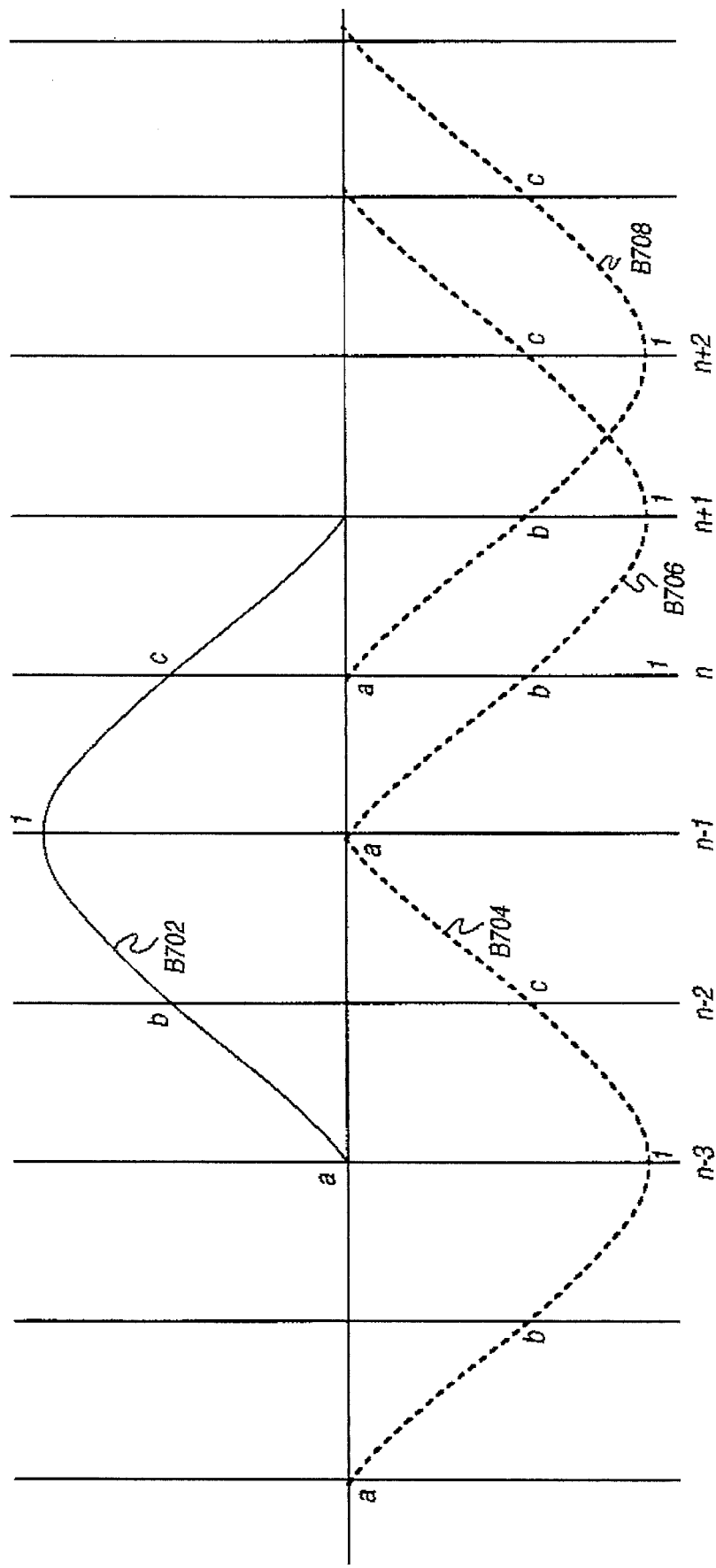

The EPR4 equations of Table B9 incorporate the same type of adjustment for ISI that was incorporated into the side sampled equations. As shown in FIG. 10, pulses B704, B706, and B708 can overlap the pulse B702, and if this occurs, the "a" sample of pulse B706 overlaps the "1" sample of pulse B702. Therefore, the EPR4 equation adds the term "$-a*Pn-2$" to compensate for pulse B706.

U.S. Pat. No. 5,359,631 issued to Behrens et al., discloses application of the pulse detector to phase error detector B112 in a sampled amplitude read channel in order to implement timing recovery. For PR4 and EEPR4 equalization, the phase error detector B112 generates a phase error $\Delta t$ according to Table B10, and for EPR4, according to Table B11. In Table B10 and Table B11, $SGN(x)$ is +1 if $x>=0$ and $-1$ if $x<0$, $\{a,b,c\}$ are the target sample values for an isolated pulse as shown in FIG. 7 and FIG. 8, ta and tt are acquisition and tracking constants that compensate for asymmetry in the pulses, and Pn is one if a pulse is detected at time n.

Referring to FIG. 7 and Table B10, for a PR4 or EEPR4 symmetric isolated pulse the phase error will be zero if the value Of the sample taken at n–2 , that is, the "b" sample, is equal to the value of the sample taken at n–1, that is, the "1" sample. This result is shown in the PR4 and EEPR4 tracking equation of Table B10 as Y(n–2)–Y(n–1), where Y(x) represents the sample value at time x. Since pulses can occur in both positive and negative directions, the sign of Y(n–1) is multiplied into this equation to account for negative sample values. Thus, for a PR4 or EEPR4 pulse, the phase error Δt is computed, when a pulse is detected at time n, as:

$$\Delta t = SGN(Y(n-1))*(Y(n-2)-Y(n-1)).$$

This phase error will be zero if the peak of the pulse occurs exactly at the center between the "b" and "1" samples, and will be non-zero if the peak is offset from the center. If the peak is offset left of center, the "b" sample value will be higher than the "1" sample value, resulting in a positive phase error value, and if the peak is offset right of center, the "b" sample value will be lower than the "1" sample value, resulting in a negative phase error value.

The terms ta and tt in the equations of Table B10 and Table B11 compensate for asymmetries in the pulse. There are many factors that may cause a pulse to be asymmetric, including magnetic, geometrical, and electronic factors. Because of this possible asymmetry, the term ta and tt is introduced into the equation for acquisition and tracking modes, respectively. The values for ta and tt are established by calibrating the device, however, Table B12 shows nominal values for ta and tt.

Considering again the effect of ISI shown in FIG. 9 for PR4 and EEPR4 equalization. Pulse B604 may occur two sample times earlier than pulse B602 and the effects of this pulse must be considered in the equations of Table B10. The term "c*Pn–2" accounts for the ISI effect of pulse B604. Sample "c" of pulse B604 occurs at the same time as sample "b" of pulse B602. Therefore, if there was a peak detected at time n–2, i.e. Pn–2 is one, the phase error is corrected by adding a constant value c to offset the "c" sample of pulse B604. Similarly, a pulse could occur two sample times after pulse B602, represented by pulse B606. For this pulse, the "a" sample occurs at the same time as the "1" sample of pulse B602. Therefore, the phase error is corrected by subtracting a constant "a" if there is a pulse at time n+2, i.e. if Pn+2 is one. The value for constants a and c are determined by calibrating the device.

The acquisition equation of Table B10 for PR4 and EPR4 equalization is similar to the tracking mode equation, except that the corrections for the pulses B604 and B606 need not occur. These corrections are unnecessary because, in acquisition mode, the data pattern is known. Therefore, the entire compensation for asymmetry and intersymbol interference can be accomplished with a single term ta. Table B12 shows nominal values for ta for three exemplary acquisition patterns.

Referring now to FIG. 8 and Table B11, the phase error Δt for an isolated EPR4 symmetric pulse is computed, when a pulse is detected at time n, as:

$$\Delta t = SGN(Y(n-1))*(Y(n-2)-Y(n)).$$

This phase error will be zero if the peak of the pulse occurs exactly at the center of the "1" sample, and will be non-zero if the peak is offset from the center. If the peak is offset left of center, the "b" sample value will be higher than the "c" sample value, resulting in a positive phase error value, and if the peak is offset right of center, the "b" sample value will be lower than the "c" sample value, resulting in a negative phase error value. Again, the terms ta and tt are added to the equation to compensate for asymmetries in the pulse. The nominal settings for ta and tt are shown in Table B12.

Consider again the effect of ISI shown in FIG. 10. Pulse B704 can overlap pulse B702, and if this occurs, the "c" sample of pulse B704 overlaps the "b" sample of pulse B702. Therefore, the EPR4 tracking equation of Table B11 adds the term "c*Pn–2" to compensate for the pulse B704. Similarly, pulse B706 can overlap pulse B702 and the center sampled tracking equation subtracts the term "b*Pn+2" to compensate for the pulse B706. The values of constants b and c are determined by calibrating the device.

For EPR4 equalization, a third pulse, B708, can also overlap the pulse B702. One possible way to compensate for the pulse B708 would be to subtract a constant "a" times Pn+3. However, this requires that the detector wait at least three sample times before determining the phase error for the pulse B702. As shown in FIG. 10, the value of the "a" sample for pulse B708 will typically be very small for center sampling. Because it is very small, this term of the equation can be deferred to a later clock cycle without much consequence. When deferred by three sample times, the correction "a*Pn+3" may be included in the phase error equation for the next pulse (at time n+3), at which time it is included as "–a*Pn–3". Therefore, the EPR4 tracking equation of Table B11 includes the term "–a*Pn–3" to provide compensation for pulse B708.

Figure 11A:
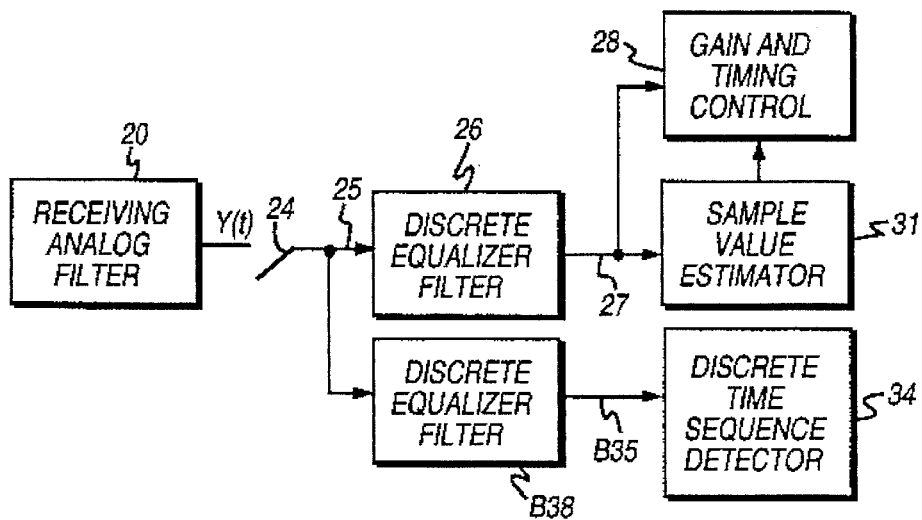
FIGS. 11A, 11B, and 11C illustrate alternative configurations to equalize for sample value estimation and sequence detection.
Figure 11B:
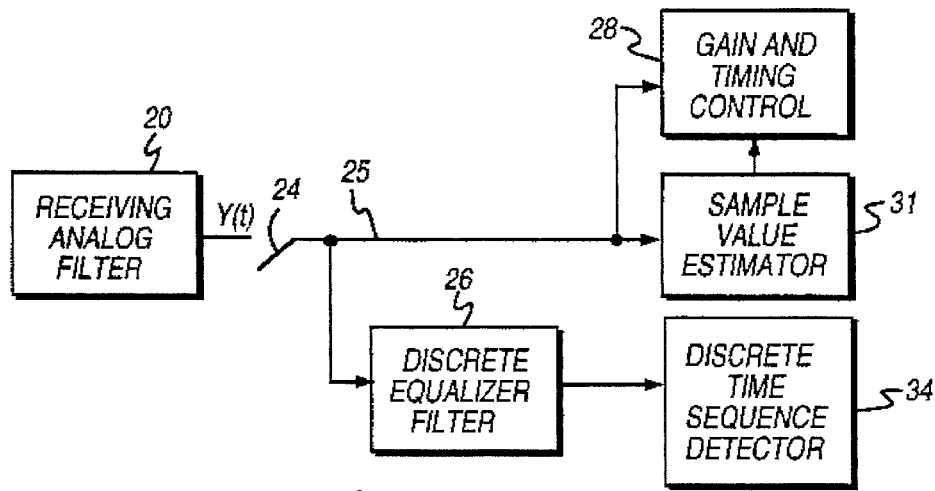
Figure 11C:
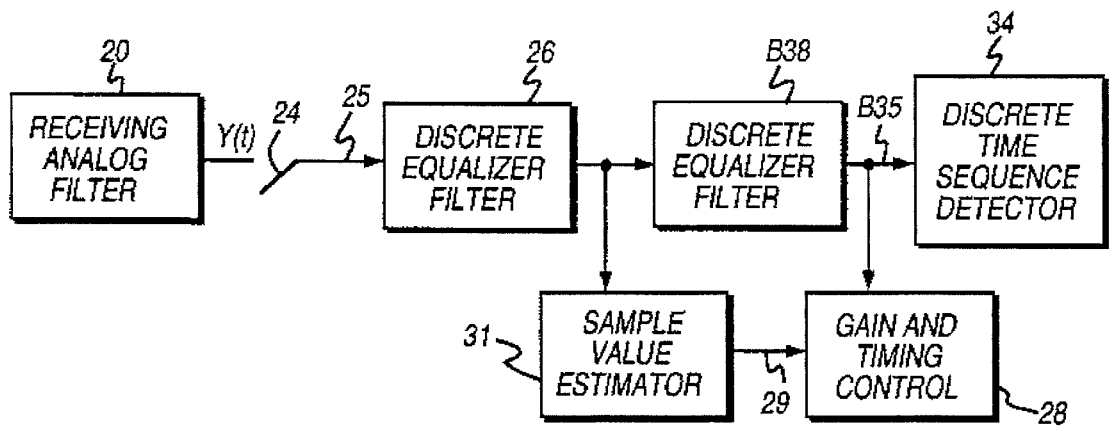

FIGS. 11A, 11B, and 11C show alternative embodiments for equalizing the read signal for sample value estimation 31 and for discrete time sequence detection 34. FIG. 11A shows a first discrete time equalizing filter 26 for sample value estimation, and a second discrete time equalizing filer B38, connected in parallel, for discrete time sequence detection 34. FIG. 11B shows equalization for sample estimation using only the receiving analog filter 20 and a discrete time equalizing filter 26 for discrete time sequence detection 34. Another embodiment is to use the sample values 25 from the analog filter 20 for discrete time sequence detector 34 and the sample values from a discrete time equalizing filter 26 for sample value estimation 31. In yet another embodiment, as shown in FIG. 11C, a first discrete time equalizing filter 26 is used for sample value estimation, and a second discrete time equalizing filter B38 is used for gain and timing control 28 and for discrete time sequence detection 34.

The objects of the invention have been fully realized through the embodiment disclosed herein. Those skilled in the art will appreciate that the aspects of the invention can be achieved through various embodiments without departing from the spirit and scope of the invention. The particular embodiment disclosed is illustrative and not meant to limit the scope of the invention as appropriately construed by the following claims.

TABLE 1

| Channel | Transfer Function | Dipulse Response |
|---|---|---|
| PR4 | (1 – D) (1 + D) | 0, 1, 0, –1, 0, 0, 0, . . . |
| EPR4 | (1 – D) (1 + D)$^2$ | 0, 1, 1, –1, –1, 0, 0, . . . |
| EEPR4 | (1 – D) (1 + D)$^3$ | 0, 1, 2, 0, –2, –1, 0, . . . |

TABLE B2

| Desired Response | Recording Channel & Analog Filter | PC1 | PC2 | PC3 |
|---|---|---|---|---|
| $(1-D)(1+D)$ | $(1-D)(1+D)$ | 1 | 0 | 0 |
| $(1-D)(1+D)$ | $(1-D)$ | 1 | 1 | 0 |
| $(1-D)(1+D)^2$ | $(1-D)(1+D)^2$ | 1 | 0 | 0 |
| $(1-D)(1+D)^2$ | $(1-D)(1+D)$ | 1 | 1 | 0 |
| $(1-D)(1+D)^2$ | $(1-D)$ | 1 | 2 | 1 |

TABLE B3

| Sample Value | Slicer Output |
|---|---|
| $y \geq T1$ | +1 |
| $-T2 \leq y < T1$ | 0 |
| $y < -T2$ | −1 |

TABLE B4

| | Acquisition | Tracking |
|---|---|---|
| SGN(Y(n − 1))) = +1 (positive pulse) | Y(n − 1) > Y(n); Y(n − 1) > Y(n − 2); Y(n − 2) > Y(n − 3) | Y(n − 1) > Y(n); Y(n − 1) > Y(n − 2); Y(n − 2) > V |
| SGN(Y(n − 1)) = −1 (negative pulse) | Y(n − 1) < Y(n); Y(n − 1) < Y(n − 2); Y(n − 2) < Y(n − 3) | Y(n − 1) < Y(n); Y(n − 1) < Y(n − 2); Y(n − 2) < −V |

TABLE B5

| | Acquisition | Tracking |
|---|---|---|
| SGN(Y(n − 1))) = +1 (positive pulse) | Y(n − 2) > Y(n); Y(n − 1) > Y(n − 3); Y(n − 2) > Y(n − 4) | Y(n − 2) > Y(n); Y(n − 1) > Y(n − 3); Y(n − 1) > V; Y(n − 2) > V |
| SGN(Y(n − 1)) = −1 (negative pulse) | Y(n − 2) < Y(n); Y(n − 1) < Y(n − 3); Y(n − 2) < Y(n − 4) | Y(n − 2) < Y(n); Y(n − 1) < Y(n − 3); Y(n − 1) < −V; Y(n − 2) < −V |

TABLE B6

| | Acquisition | Tracking |
|---|---|---|
| SGN(Y(n − 1))) = +1 (positive pulse) | SGN(Y(n)) = SGN(Y(n − 1)); SGN(Y(n − 1)) != SGN(Y(n − 2)) | Z(n − 1) > V; Z(n − 1) > Z(n − 2); Z(n − 1) > Z(n) |
| SGN(Y(n − 1)) = −1 (negative pulse) | SGN(Y(n)) = SGN(Y(n − 1)); SGN(Y(n − 1)) != SGN(Y(n − 2)) | Z(n − 1) < −V; Z(n − 1) < Z(n − 2); Z(n − 1) < Z(n) |

TABLE B7

| | Acquisition | Tracking |
|---|---|---|
| SGN(Y(n − 1))) = +1 (positive pulse) | SGN(Z(n)) = SGN(Z(n − 1)); SGN(Z(n − 1)) != SGN(Z(n − 2)) | Y(n − 1) > V; Y(n − 1) > Y(n − 2); Y(n − 1) > Y(n) |
| SGN(Y(n − 1)) = −1 (negative pulse) | SGN(Z(n)) = SGN(Z(n − 1)); SGN(Z(n − 1)) != SGN(Z(n − 2)) | Y(n − 1) < −V; Y(n − 1) < Y(n − 2); Y(n − 1) < Y(n) |

TABLE B8

| Acquisition | Tracking |
|---|---|
| Pn*[−SGN(Y(n − 1))*(Y(n − 1) + Y(n − 2)) + ga − (a + c)Pn − 2] | Pn*[−SGN(Y(n − 1))*(Y(n − 1) + Y(n − 2)) + gt − (a + c)Pn − 2] |

TABLE B9

| Acquisition | Tracking |
|---|---|
| Pn*[−SGN(Y(n − 1))*(Y(n − 1)) + ga − a*Pn − 2] | Pn*[−SGN(Y(n − 1))*(Y(n − 1)) + gt − a*Pn − 2] |

TABLE B10

| Acquisition | Tracking |
|---|---|
| Pn*[SGN(Y(n − 1))*(Y(n − 2) − Y(n − 1)) + ta] | Pn*[SGN(Y(n − 1))*(Y(n − 2) − Y(n − 1)) + tt + c*Pn − 2 − a*Pn + 2] |

TABLE B11

| Acquisition | Tracking |
|---|---|
| Pn*[SGN(Y(n − 1))*(Y(n − 2) − Y(n)) + ta] | Pn*[SGN(Y(n − 1))*(Y(n − 2) − Y(n)) + tt + c*Pn − 2 − b*Pn + 2 − a*Pn − 3] |

TABLE B12

| | Acquistion Pattern | Nominal ta | Nominal tt |
|---|---|---|---|
| PR4 and EEPR4 | 1010 . . . | 1 − b + c − a | |
| | 100100 . . . | 1 − b | 1 − b |
| | 10001000 . . . | 1 − b | |
| EPR4 | 1010 . . . | 2 * (c − b) | |
| | 100100 . . . | c − b + a | c − b |
| | 10001000 . . . | c − b | |

We claim:

1. A sampled amplitude read channel for reading digital data from a magnetic medium by detecting the digital data from a sequence of discrete time sample values generated by sampling pulses in an analog signal from a magnetic read head positioned over the magnetic medium, said sampled amplitude read channel comprising:

(a) a first discrete time equalizing filter, responsive to the discrete time sample values, for filtering the discrete time sample values into a predetermined first equalization and outputting first equalized sample values;

(b) a second discrete time equalizing filter, responsive to the discrete time sample values, for filtering the discrete time sample values into a predetermined second equalization and outputting second equalized sample values;

(c) a sample value processor, connected to receive the first equalized sample values, for generating a control signal;

(d) an error detector, connected to receive the control signal and the first equalized sample values, for generating an error signal; and (e) a discrete time sequence detector, connected to receive the second equalized sample values, for detecting the digital data.

2. The sampled amplitude read channel as recited in claim 1, wherein:

(a) the first discrete time equalizing filter equalizes the discrete time sample values into a PR4 equalization; and (b) the second discrete time equalizing filter equalizes the discrete time sample values into an equalization selected from the group consisting of EPR4 and EEPR4.

3. The sampled amplitude read channel as recited in claim 1, wherein d=0.

4. The sampled amplitude read channel as recited in claim 1, wherein the first discrete time equalizing filter comprises programmable coefficients programmed to generate the first equalization.

5. The sampled amplitude read channel as recited in claim 1, wherein the second discrete time equalizing filter comprises programmable coefficients programmed to generate the second equalization.

6. The sampled amplitude read channel as recited in claim 1, wherein the first and second discrete time equalizing filters are connected in series.

7. The sampled amplitude read channel as recited in claim 1, wherein:

(a) the sampling of the analog signal occurs at a predetermined sampling frequency;

(b) the discrete time sequence detector is clocked at half the sampling frequency; and (c) the second discrete time equalizing filter is a notch filter for attenuating a noise signal in the discrete time sample values associated with clocking the sequence detector at half the sampling frequency.

8. The sampled amplitude read channel as recited in claim 1, wherein the sample value processor is a slicer for generating estimated sample values X(n) according to the following table:

| sample value | slicer output |
|---|---|
| y >= T1 | +M |
| −T2 <= y < T1 | 0 |
| y < −T2 | −M | wherein:
(a) y are the first equalized sample values;
(b) T1 and T2 are predetermined thresholds; and
(c) M is a magnitude of the estimated sample values X(n).

9. The sampled amplitude read channel as recited in claim 8, wherein said predetermined thresholds T1 and T2 are programmable.

10. The sample amplitude read channel as recited in claim 8, further comprising timing control for synchronizing the sampling of the pulses, wherein:
(a) the error detector is a phase error detector and the error signal is a phase error $\Delta t(n)$; and
(b) the phase error $\Delta t(n)$ is proportional to:

$$(Y(n-1)*X(n))-(Y(n)*X(n-1))$$

wherein Y(n) are the first equalized sample values.

11. The sampled amplitude read channel as recited in claim 8, further comprising gain control for adjusting the amplitude of the analog signal, wherein:
(a) the error detector is a gain error detector and the error signal is a gain error $\Delta g(n)$; and
(b) said gain error $\Delta g(n)$ is proportional to:

$$(Y(n)-x(n))*X(n)$$

wherein Y(n) are the first equalized sample values.

12. The sampled amplitude read channel as recited in claim 1, wherein the sample value processor is a pulse detector for detecting pulses in the analog signal and outputting a pulse signal Pn.

13. The sampled amplitude read channel as recited in claim 12, wherein:
(a) the first discrete time equalizing filter equalizes the sample values into an EPR4 equalization; and
(b) the second discrete time equalizing filter equalizes the sample values into an EEPR4 equalization.

14. The sampled amplitude read channel as recited in claim 12, further comprising timing recovery for synchronizing the sampling of the pulses, wherein:
(a) the error detector is a phase error detector and the error signal is a phase error $\Delta t(n)$;
(b) the read channel operates in an acquisition and tracking mode;
(c) when the read channel is in acquisition mode, the phase error $\Delta t(n)$ is proportional to:

$$Pn*[SGN(Y(n-1))*(Y(n-2)-Y(n-1))+ta];$$

(d) when the read channel is in tracking mode, the phase error $\Delta t(n)$ is proportional to:

$$Pn*[SGN(Y(n-1))*(Y(n-2)-Y(n-1))+tt+c*Pn-2-a*Pn+2];$$

(e) Y(n) are the first equalized sample values;
(f) a and c are predetermined constants;
(g) SGN(x) is +1 for x>=0 and −1 for x<0;
(h) ta is a predetermined acquisition timing set point; and
(i) tt is a predetermined tracking timing set point.

15. The sampled amplitude read channel as recited in claim 12, further comprising timing recovery for synchronizing the sampling of the pulses, wherein:
(a) the error detector is a phase error detector and the error signal is a phase error $\Delta t(n)$;
(b) the read channel operates in an acquisition and tracking mode;
(c) when the read channel is in acquisition mode, the phase error $\Delta t(n)$ is proportional to:

$$Pn*[SGN(Y(n-1))*(Y(n-2)-Y(n))+ta];$$

(d) when the read channel is in tracking mode, the phase error $\Delta t(n)$ is proportional to:

$$Pn*[SGN(Y(n-1))*(Y(n-2)-Y(n))+tt+c*Pn-2-b*Pn+2-a*Pn-3];$$

(e) Y(n) are the second equalized sample values;
(f) a, b and c are predetermined constants;
(g) SGN(x) is +1 for x>=0 and −1 for x<0;
(h) ta is a predetermined acquisition timing set point; and
(i) tt is a predetermined tracking timing set point.

16. The synchronous read channel as recited in claim 12, further comprising gain control for adjusting the amplitude of the analog signal, wherein:
(a) the error detector is a gain error detector and the error signal is a gain error $\Delta g$; and
(b) the read channel operates in an acquisition and tracking mode;
(c) when the read channel is in acquisition mode, the gain error $\Delta g$ is proportional to:

$$Pn*[-SGN(Y(n-1))*(Y(n-1)+Y(n-2))+ga-(a+c)Pn-2];$$

(d) when the read channel is in tracking mode, the gain error $\Delta g(n)$ is proportional to:

$$Pn*[-SGN(Y(n-1))*(Y(n-1)+Y(n-2))+gt-(a+c)Pn-2];$$

(e) Y(n) are the first equalized sample values;
(f) a and c are predetermined constants;
(g) SGN(x) is +1 for x>=0 and −1 for x<0;
(h) ga is a predetermined acquisition gain set point; and
(i) gt is a predetermined tracking gain set point.

17. The synchronous read channel as recited in claim 12, further comprising gain control for adjusting the amplitude of the analog signal, wherein:
(a) the error detector is a gain error detector and the error signal is a gain error $\Delta g$; and
(b) the read channel operates in an acquisition and tracking mode;
(c) when the read channel is in acquisition mode, the gain error $\Delta g$ is proportional to:

$$Pn[-SGN(Y(n-1))*(Y(n-1))+ga-a*Pn-2];$$

(d) when the read channel is in tracking mode, the gain error $\Delta g(n)$ is proportional to:

$$Pn[-SGN(Y(n-1))*(Y(n-1))+gt-a*Pn-2];$$

(e) Y(n) are the second equalized sample values;
(f) a is a predetermined constant;
(g) SGN(x) is +1 for x>=0 and −1 for x<0;
(h) ga is a predetermined acquisition gain set point; and
(i) gt is a predetermined tracking gain set point.

18. The sampled amplitude read channel as recited in claim 12, wherein said pulse detector operates according to the following table:

|  | Acquisition | Tracking |
|---|---|---|
| SGN(Y(n − 1))) = +1 (positive pulse) | Y(n − 1) > Y(n); Y(n − 1) > Y(n − 2); Y(n − 2) > Y(n − 3) | Y(n − 1) > Y(n); Y(n − 1) > Y(n − 2); Y(n − 2) > V |
| SGN(Y(n − 1)) = −1 (negative pulse) | Y(n − 1) < Y(n); Y(n − 1) < Y(n − 2); Y(n − 2) < Y(n − 3) | Y(n − 1) < Y(n); Y(n − 1) < Y(n − 2); Y(n − 2) < −V | wherein:
- (a) the read channel operates in an acquisition and tracking mode;
- (b) SGN(x) is −1 if x<0, and SGN(x) is +1 if x>=0; and
- (c) V and −V are predetermined thresholds.

19. The sampled amplitude read channel as recited in claim 18, wherein the predetermined thresholds V and −V are programmable.

20. The sampled amplitude read channel as recited in claim 12, wherein said pulse detector operates according to the following table:

|  | Acquisition | Tracking |
|---|---|---|
| SGN(Y(n − 1))) = +1 (positive pulse) | SGN(Z(n)) = SGN(Z(n − 1)); SGN(Z(n − 1)) != SGN(Z(n − 2)) | Y(n − 1) > V; Y(n − 1) > Y(n − 2); Y(n − 1) > Y(n) |
| SGN(Y(n − 1)) = −1 (negative pulse) | SGN(Z(n)) = SGN(Z(n − 1)); SGN(Z(n − 1)) != SGN(Z(n − 2)) | Y(n − 1) < −V; Y(n − 1) < Y(n − 2); Y(n − 1) < Y(n) | wherein:
- (a) the read channel operates in an acquisition and tracking mode;
- (b) z(n)=(Y(n)+Y(n−1))/2;
- (c) SGN(x) is −1 if x<0, and SGN(x) is +1 if x>=0; and
- (d) V and −V are predetermined thresholds.

21. The synchronous read channel as recited in claim 20, wherein the predetermined thresholds V and −V are programmable.

22. A sampled amplitude read channel for reading digital data from a magnetic medium by detecting the digital data from a sequence of discrete time sample values generated by sampling pulses in an analog read signal from a magnetic read head positioned over the magnetic medium, said sampled amplitude read channel comprising:
- (a) a first equalizing filter, responsive to the analog read signal, for generating a first equalized read signal;
- (b) a second equalizing filter, responsive to the analog read signal, for generating a second equalized read signal;
- (c) a sample value processor, connected to receive the first equalized read signal, for generating a control signal;
- (d) an error detector, connected to receive the control signal and the first equalized read signal, for generating an error signal; and
- (e) a discrete time sequence detector, connected to receive the second equalized read signal, for detecting the digital data.

23. The sampled amplitude read channel as recited in claim 22, wherein the sample value processor is a sample value estimator for generating estimated sample values X(n).

24. The sampled amplitude read channel as recited in claim 22, wherein the sample value processor is a pulse detector for generating a pulse detected signal Pn.

25. The sampled amplitude read channel as recited in claim 22, further comprising timing recovery, responsive to the error signal, for synchronizing the sampling of the analog read signal.

26. The sampled amplitude read channel as recited in claim 22, further comprising automatic gain control, responsive to the error signal, for adjusting the amplitude of the analog read signal.

27. The sampled amplitude read channel as recited in claim 22, wherein:
- (a) the first equalized read signal is equalized according to a PR4 equalization; and
- (b) the second equalized read signal is equalized according to an equalization selected from the group consisting of EPR4 and EEPR4.

28. The sampled amplitude read channel as recited in claim 22, wherein:
- (a) the first equalized read signal is equalized according to a EPR4 equalization; and
- (b) the second equalized read signal is equalized according to a EEPR4 equalization.

29. The sampled amplitude read channel as recited in claim 22, wherein the first and second equalizing filters are connected in series.

* * * * *

UNITED STATES PATENT AND TRADEMARK OFFICE
CERTIFICATE OF CORRECTION

PATENT NO : 5,585,975
DATED : December 17, 1996
INVENTOR(S) : Bliss

It is certified that error appears in the above-identified patent and that said Letters Patent is hereby corrected as shown below:

On col. 6, line 60, the phrase "Further, a 1+D)" should read --Further, a (1+D)--. On col. 10, line 50, the phrase "and x(n) are" should read --and X(n) are--. On col. 10, line 65, the phrase "in d=1 recording." should read --in d=0 recording.--. On col. 21, line 38, the phrase "z(n)=" should read --Z(n)=--.

Signed and Sealed this

Twenty-fourth Day of June, 1997

Attest:

Attesting Officer

BRUCE LEHMAN

*Commissioner of Patents and Trademarks*